(No Model.)
J. W. CHISHOLM.
CAR TRUCK.
No. 250,885. Patented Dec. 13, 1881.
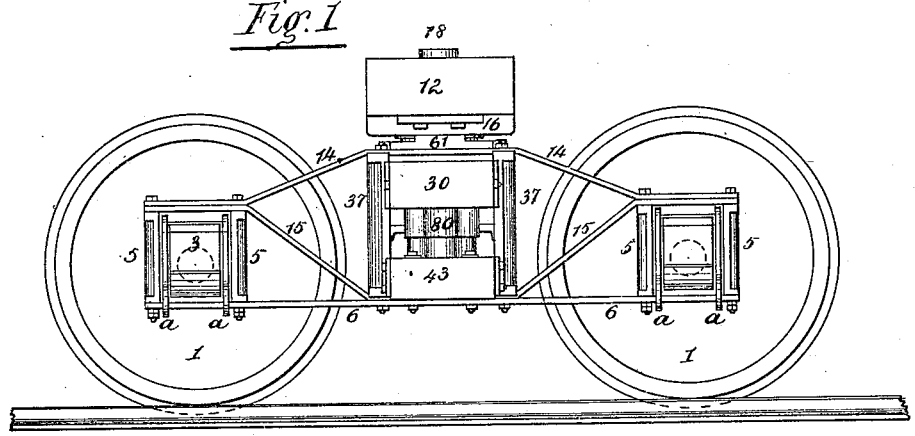
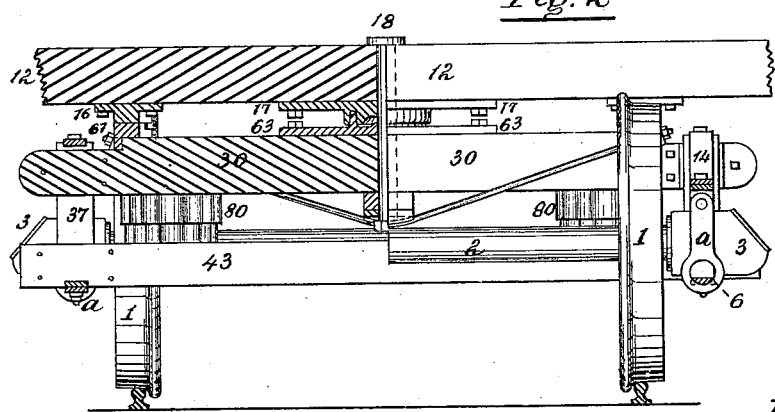
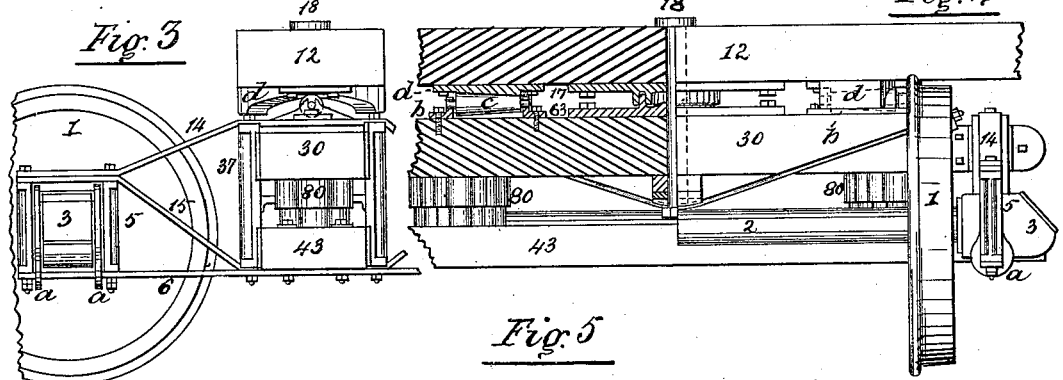
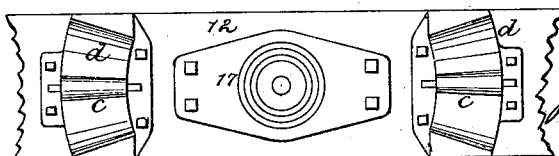
Witnesses
H. D. Williams
E. G. Praker
James W. Chisholm
Inventor
per Alfred Shedlock
Atty.

UNITED STATES PATENT OFFICE.

JAMES W. CHISHOLM, OF BROOKLYN, NEW YORK.

CAR-TRUCK.

SPECIFICATION forming part of Letters Patent No. 250,885, dated December 13, 1881.

Application filed September 15, 1881. (No model.)

*To all whom it may concern:*

Be it known that I, JAMES W. CHISHOLM, of Brooklyn, county of Kings, State of New York, have invented certain new and useful Improvements in Car-Trucks, of which the following is a specification.

Several methods have been devised to reduce the wear and tear of railway rolling stock, to lessen the vibrations and shocks due to irregularities in the rails, &c., and to decrease the traction power required to haul trains when passing around curves; and the following are typical examples of the class of devices to which my invention relates, designed to accomplish this object: first, by the application of transversely-moving links, connected at their lower ends to the car-body and at their upper ends to the axle-boxes, whereby the wheels and axles are free to independently move in relation to the car-body in a transverse direction only; second, by the application of suspension-links to car-trucks, connecting the axle-boxes to the truck-frame, and so arranged as to allow the wheels and axle to move in relation to the truck in a longitudinal direction only, the truck being connected to the car-body by the ordinary center plate and king-bolt; third, by the combination of suspension-links connecting the axle-boxes to the truck-frame, whereby the wheels and axles are free to move in a transverse direction only in relation to the truck-frame, with suspension-links connecting the truck-frame to the car-body, and so arranged that the truck is free to move longitudinally in relation to the car-body, and to swivel thereunder.

Now, my invention consists of the combination of axle-box suspension-links, arranged, as last described, to permit of free transverse movement of the wheels and axles in relation to the truck-frame, with a rigid swiveling connection between the truck-frame and car-body, by which combination the rigid swiveling connection allows the truck-frame to assume a radial direction on the sharpest curves, and the transverse movement of the axles and wheels cause such radial action to take place without shock or undue disturbance to the car-body. The freedom and extent of the swiveling action of the truck under the car-body and the transverse freedom of the wheels and axles combine to materially reduce the draft of the car when passing around curves; and the gravity of the car when leaving a curve, being no longer opposed by the centrifugal force of the car, tends to bring the wheels and axles gradually back into their normal positions, thereby assisting the change of direction of motion of the truck, taking place with ease, when it passes on the straight track from a curve or onto a reverse curve, without sudden shock. I also propose in some cases to support the car-body on the truck by means of double-inclined side bearing plates and rollers, so that when the truck is swiveled under the car-body the body will be raised up somewhat and the gravity of the same utilized to assist the truck to assume its proper position in relation to the car-body as it leaves a curve.

To the accompanying drawings, forming part of this specification, I will now refer to more fully describe the construction of my improvements in car-trucks.

Figure 1 is a side elevation. Fig. 2 is a part end elevation and a part central transverse section. Fig. 3 is a part side elevation, showing the application of the double-inclined side bearing-plates. Fig. 4 is an end elevation of the same, partly in section; and Fig. 5 is an inverted view of the car-body bolster, showing the double-inclined side bearing-plates attached thereto.

The style of truck which I have shown embodying my improvements is what is known as the "diamond truck," and consists of side frames composed of the arch-bar 14, inverted arch-bar 15, pedestal tie-bar 6, bolster guide-bar 37, and pedestals 5. The two side frames are connected together by the spring-plank 43, between which and the truck-bolster 30 are placed the bolster-springs 80. My improvements may be applied to any other form of trucks.

The wheels 1 and the axles 2 are of the ordinary construction; but the axle-boxes 3 are provided with a recess, in which rests a rod connected to and forming the upper bearing of the transverse suspension-links $a$. These links $a$ hang down between the sides of the axle-boxes 3 and pedestals 5, and their lower ends surround the pedestal tie-bar 6, which is rounded or provided with round bearing-plates, so that the links $a$ are free to rock thereon, carrying with them the axle-boxes 3, axles 2, and wheels 1, in a direction transversely to the track. It may be advantageous to make these transverse suspension-links shorter than heretofore, so that the gravity of the car will have greater effect in turning the axles and wheels and the truck into their normal positions.

Any rigid swiveling connection between the truck and car-body may be used. The one shown in the drawings is as follows: The truck is connected to the car-body bolster 12 by the body-bolster center plate, 17, and truck center plate, 63, and the king-bolt 18, which passes through these center plates and forms the center on which the truck swivels under the car-body.

16 represents the body-bolster side bearings, and 61 the truck side bearings.

The truck shown in Figs. 3, 4, and 5 is similar to that shown in Figs. 1 and 2, with the exception of the substitution for the side bearings, 16 and 61, of the improved gravity-bearings, which consist of the truck bearing-plates $b$, secured to the truck-bolster 30, and provided with bearings in which rest the conical rollers $c$, the apexes of which, if their sides were extended, would be at the center of the swiveling device, or the king-bolt 18. Secured to the under side of the car-body bolster 12 are the curved double-inclined plates $d$, the meeting-points of the two inclines being at the center line of the bolster, so that as the plates rest on the conical roller $c$ the gravity of the car, when it is not opposed by other forces, causes the roller $c$ to assume this central position, and so bring the axles and the body-bolster parallel. In the inverted view of the body-bolster, Fig. 5, the conical rollers $c$ are shown occupying this central position.

It will be seen by reference to Fig. 3 that whichever way the truck swivels under the car-body the body will be raised by one of the inclined surfaces of the plate $d$ riding over the roller $c$, and the pitch of these inclined surfaces may be made to give any desired rise to the body.

The transverse axle-box suspension-links $a$ are described in Letters Patent of the United States to W. H. H. Sisum, No. 208,857, dated October 8, 1878, and the application for Letters Patent of E. R. Esmond, No. 3,914, filed March 1, 1880. So I wish it understood that I do not claim the same; nor do I claim, broadly, the double-inclined bearing-plates and supporting-rollers.

Having now described my invention, what I claim, and desire to secure by Letters Patent, is—

1. The king-bolt 18, connecting the truck-frame to the car-body bolster 12, in combination with the suspension-links $a\ a$, connecting the axle-boxes 3 3 with the truck-frame, all arranged to operate substantially as described.

2. In a car-truck, in combination, axle-box suspension-links adapted to allow the axles and wheels to move transversely in the truck-frame, double-inclined bearing-plates, and supporting-rollers, whereby the car-body is raised as the truck swivels thereunder, and a central king-bolt or rigid swiveling connection, substantially as hereinbefore set forth.

In witness whereof I have hereunto set my hand this 13th day of September, A. D. 1881.

JAMES W. CHISHOLM.

Witnesses:
   JAMES A. HUDSON,
   E. G. BAKER.